United States Patent [19]

Van Der Steen

[11] 4,013,436
[45] Mar. 22, 1977

[54] METHOD FOR THE PRODUCTION OF OBJECTS OF QUARTZ-GLASS BY DRAWING

[75] Inventor: Gerardus Henricus Antonius Maria Van Der Steen, Eindhoven, Netherlands

[73] Assignee: U.S. Philips Corporation, New York, N.Y.

[22] Filed: Nov. 10, 1975

[21] Appl. No.: 630,534

[30] Foreign Application Priority Data

Nov. 18, 1974 Netherlands ...................... 7414977

[52] U.S. Cl. ..................................... 65/32; 65/134; 65/136
[51] Int. Cl.$^2$ .......................................... C03B 5/16
[58] Field of Search ...................... 65/32, 134, 136

[56] References Cited

UNITED STATES PATENTS 3,764,286  10/1973  Antczak et al. ..................... 65/134
3,850,602  11/1974  Bruning ............................. 65/32 X Primary Examiner—Robert L. Lindsay, Jr.
Attorney, Agent, or Firm—Frank R. Trifari; Robert S. Smith

[57] ABSTRACT

A method for the production of quartz glass objects starting from a melt of silicon dioxide in a helium-hydrogen atmosphere. Oxides, hydroxides or other compounds of K, Mg, Ca, Sr and/or Ba are added in a quantity of between 5 and 200×10$^{-3}$ mol.%. The quartz glass obtained has consequently considerable fewer trapped gas bubbles.

1 Claim, No Drawings

METHOD FOR THE PRODUCTION OF OBJECTS OF QUARTZ-GLASS BY DRAWING

The invention relates to a method for the production of quartz glass objects by drawing from a melt.

The Swiss Pat. No. 540,859 describes a method for the continuous production of elongated objects of molten quartz according to which starting material consisting of silicon dioxide in particle form, is fed continuously at a predetermined speed into the upper part of a heated furnace, the starting material is continuously melted in the upper heated zone of the furnace in a gas atmosphere of hydrogen and helium in a ratio by volume of 40–65% of hydrogen to 60–35% of helium and at a melting temperature which is not less than 2050° C, heating of th molten material is continued in the lower zone of the furnace by means of a separate heating device while a temperature is maintained which is lower than 2050° C in the molten material and that the molten material is continuously drawn from the lower zone of the furnace by means of a forming device in the presence of an atmosphere which contains hydrogen in a non-oxidizing carrier gas.

The effect of this procedure is that a quartz glass is obtained which has a considerably lower number of trapped gas bubbles than quartz glass which is produced according to older methods. Trapped gas bubbles produce channels in the drawn product in the direction of drawing, which makes the quartz glass less suitable for application as envelope, for example of lamps, which must satisfy optical requirements. The procedure described above is performed in an atmosphere consisting of gases which easily diffuse through the molten quartz glass and which can readily dissolve in it. Consequently, the product obtained contains considerably fewer trapped gas bubbles and is, moreover, dimensionally stable to a very high degree.

It is an object of the invention also to eliminate the remaining gas bubbles from the quartz glass and to obtain in that manner a quartz glass which is fully free of bubbles. The occurrence of these gas bubbles was attributed to the escape, owing to cooling during the drawing process, of gases which dissolved at the melting temperature.

When the above method is performed, starting material is used according to the invention consisting of silicon dioxide in particle form to which oxides, hydroxides or other compounds have been added which upon heating are converted to oxides, of K and/or Mg in a quantity of between 50 and $200 \times 10^{-3}$ mol.% and/or Ca, Ba and/or Sr in a quantity of between 5 and $200 \times 10^{-3}$ mol.%.

It is observed that from the published German Pat. No. 2,205,560 a method is known for the production of quartz glass which is free of bubbles and OH, according to which ground rock crystal is subjected to a pre-treatment before it is melted to a quartz glass. This pre-treatment consists in that the rock crystal granules are doped with a salt whose cation consists of lithium, sodium, potassium, magnesium, calcium, strontium or silver at a temperature of between 800° and 1700° C and a vapour pressure of at least 5 mm Hg, preferably more than 100 mm Hg or with a mixture of such salts in a quantity which corresponds at least with the predetermined OH content, that the doped rock crystal granules are revolved in a reaction room which is heated at a temperature of between 800° and 1700° C and whose atmosphere has been enriched with salt vapour, that the revolved rock crystal granules are flushed with a gas which is free of water vapour at a temperature of between 800° and 1700° C and that the gas-flushed rock crystal granules are melted in a known melting furnace in an atmosphere which is free of water vapour.

This method is limited to starting material consisting of ground rock crystal. Said pre-treatment of the rock crystal granules is performed with a quantity of salt in the order of 1 to 10 ppm. Owing to the pre-treatment OH–ions are exchanged in the basic material for cations of one of the salts. The method performed within the scope of the present invention is based on starting which is less affected by an increasing shortage such as sand, which is melted in an atmosphere containing hydrogen gas. The melting in this atmosphere introduces much hydrogen into the melt of the quartz glass, which can easily escape again to form bubbles at the melting temperature. The additions according to present invention, which by far exceed those according to the German patent application have indeed quite a different effect, namely the prevention of the production of hydrogen in the form of gas bubbles during cooling the forming process.

In the described hereafter substances were added, in the quantities shown in the table, to a mixture consisting of $SiO_2$. The $SiO_2$ powder was moistened with a solution of the nitrate of the relevant cation and thereafter dried at 150° C. Thereafter the product is heated in oxygen or in air to a temperature of 1000° C for 5 minutes and thereafter melted at 1950° C in a hydrogen atmosphere.

In order to display the formation of bubbles the products obtained are tempered at 1700° C for 15 minutes. The following table shows comparison in the number of bubbles. The figures range from 0 to 100; 0 means practically no bubbles, 10 is the result without addition according to the invention and 100 is a great nunber of bubbles.

The table also shows that additions of $Na_2O$ and $Li_2O$ have no effect, that $Li_2O$ in larger quantities even has a deteriorating influence.

|  | $10\times10^{-3}$ mol.% | $50\times10^{-3}$ mol.% | $100\times10^{-3}$ mol.% |
|---|---|---|---|
| no addition | 10 | 10 | 10 |
| $Li_2O$ | 10 | 10 | 100 |
| $Na_2O$ | 10 | 10 | 10 |
| $K_2O$ | 10 | 5 | 1 |

|  | $5\times10^{-3}$ mol.% | $50\times10^{-3}$ mol.% | $100\times10^{-3}$ mol.% |
|---|---|---|---|
| MgO | 10 | 10 | 5 |
| CaO | 10 | 5 | 3 |
| SrO | 5 | 0 | 0 |
| BaO | 1 | 0 | 0 |

What is claimed is:

1. A method for the continuous production of elongated objects of molten quartz which comprises: providing a starting material consisting of silicon dioxide in particle form, passing said starting material continuously at a predetermined rate to the upper part of a heated furnace, melting the starting material continuously in the upper, heated zone of the furnace in a gas atmosphere of hydrogen and helium in a volume ratio of 40–75% of hydrogen to 60–35% of helium at a melting temperature which is not less than 2050° C, heating of the molten material in the lower zone of the furnace by means of a separate heating device while a temperature is maintained which is less than 2050° C in the molten material and drawing the molten material continuously from the lower zone of the furnace by means of a forming device in the presence of an atmosphere containing hydrogen in a non-oxidizing carrier gas, said starting material including silicon dioxide in particle form with oxides, hydroxides or compounds which upon heating are converted to oxides, of K and/or Mg in a quantity of between 50 and $200 \times 10^{-3}$ mol.% and/or Ca, Ba and/or Sr. in a quantity of between 5 and $200 \times 10^{-3}$ mol.%.

* * * * *